(12) United States Patent
Das et al.

(10) Patent No.: US 10,372,115 B2
(45) Date of Patent: Aug. 6, 2019

(54) MODULAR AND RECONFIGURABLE MANUFACTURING SYSTEMS

(71) Applicants: Aditya Narayan Das, Irving, TX (US); Stephen Savoie, Arlington, TX (US)

(72) Inventors: Aditya Narayan Das, Irving, TX (US); Stephen Savoie, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1114 days.

(21) Appl. No.: 14/061,063

(22) Filed: Oct. 23, 2013

(65) Prior Publication Data

US 2014/0121803 A1    May 1, 2014

Related U.S. Application Data

(60) Provisional application No. 61/719,163, filed on Oct. 26, 2012.

(51) Int. Cl.
*B25J 9/16* (2006.01)
*G05B 19/418* (2006.01)
*B23Q 37/00* (2006.01)

(52) U.S. Cl.
CPC ..... *G05B 19/41845* (2013.01); *B23Q 37/005* (2013.01); *G05B 2219/31044* (2013.01); *Y02P 90/04* (2015.11); *Y02P 90/16* (2015.11); *Y02P 90/185* (2015.11)

(58) Field of Classification Search
CPC .... Y10S 901/01; Y10S 901/02; Y10S 901/09; Y10T 74/20305; B25J 13/00; B25J 9/08; B25J 9/047; A63H 33/042; A63H 33/046; G05B 19/4141; G05B 2219/33337; G05B 2219/33053; G05B 2219/33167
See application file for complete search history.

(56) References Cited

U.S. PATENT DOCUMENTS 4,089,427 A * 5/1978 Pardo .................... B25J 9/0012
403/261
4,467,436 A * 8/1984 Chance .............. G05B 19/4141
700/249

(Continued)

FOREIGN PATENT DOCUMENTS

EP           0081299 B1 *  3/1987  ................ B25J 9/00
KR     1020110120696 A     11/2011

OTHER PUBLICATIONS

Tolio, T., "Design of Flexible Production Systems—Methodologies and Tools", Berlin: Springer, 2009.

(Continued)

*Primary Examiner* — Darrin D Dunn
(74) *Attorney, Agent, or Firm* — Thomas | Horstemeyer, LLP

(57) ABSTRACT

In one embodiment, a manufacturing system includes multiple manipulation modules each including means for mechanically and electrically connecting the module to another component in the system and an end effector including means for mechanically and electrically connecting the end effector to another component in the system, wherein the modules and end effector can be mechanically and electrically connected in multiple ways to alter the configuration of the system and the manufacturing tasks that the system can perform.

5 Claims, 7 Drawing Sheets

(56) References Cited

U.S. PATENT DOCUMENTS

| | | | |
|---|---|---|---|
| 4,600,355 A * | 7/1986 | Johnson | B25J 9/046 248/558 |
| 4,766,775 A * | 8/1988 | Hodge | B25J 9/08 74/490.01 |
| 4,767,257 A | 8/1988 | Kato | |
| 4,975,856 A * | 12/1990 | Vold | B25J 9/1602 318/568.19 |
| 4,990,022 A * | 2/1991 | Watanabe | B25J 15/04 285/362 |
| 4,990,839 A * | 2/1991 | Schonlau | B25J 9/08 318/568.15 |
| 5,108,140 A * | 4/1992 | Bartholet | B25J 15/0009 294/106 |
| 5,195,388 A | 3/1993 | Zona | |
| 5,428,713 A * | 6/1995 | Matsumaru | B25J 9/1615 700/245 |
| 5,523,662 A * | 6/1996 | Goldenberg | B25J 9/06 318/568.11 |
| 5,581,166 A * | 12/1996 | Eismann | B25J 9/04 318/568.18 |
| 5,712,552 A * | 1/1998 | Hirai | B25J 19/0029 318/568.1 |
| 6,014,909 A * | 1/2000 | Fiora | B25J 15/04 74/490.02 |
| 6,084,373 A * | 7/2000 | Goldenberg | B25J 9/08 318/568.11 |
| 6,331,181 B1 * | 12/2001 | Tierney | G06Q 30/02 606/130 |
| 6,454,624 B1 * | 9/2002 | Duff | A63H 33/042 414/915 |
| 6,605,914 B2 * | 8/2003 | Yim | A63H 33/042 318/568.11 |
| 6,636,781 B1 * | 10/2003 | Shen | B08B 9/045 318/568.11 |
| 6,686,717 B2 * | 2/2004 | Khairallah | B25J 9/08 318/568.11 |
| 7,096,091 B2 * | 8/2006 | Haas | G01N 35/0092 414/799 |
| 7,296,962 B2 * | 11/2007 | Kent | B25J 9/107 414/744.5 |
| 7,734,379 B2 * | 6/2010 | Graves | G06Q 20/102 210/138 |
| 7,965,006 B2 * | 6/2011 | Kang | B25J 19/0004 310/103 |
| 8,175,747 B2 * | 5/2012 | Lee | A63H 11/00 318/568.11 |
| 8,234,950 B1 * | 8/2012 | Shen | B25J 9/08 74/490.05 |
| 8,336,419 B2 * | 12/2012 | Kent | B25J 9/107 74/490.05 |
| 8,453,533 B2 * | 6/2013 | Ryland | B08B 9/045 74/490.05 |
| 8,456,533 B2 * | 6/2013 | Tsujii | G11B 27/034 348/207.1 |
| 8,682,416 B2 * | 3/2014 | Lin | A61B 34/73 600/473 |
| 9,358,687 B2 * | 6/2016 | Emami | B25J 9/08 |
| 2002/0053893 A1 | 5/2002 | Khairallah | |
| 2003/0038607 A1 * | 2/2003 | Yim | A63H 33/042 318/568.11 |
| 2003/0048088 A1 * | 3/2003 | Brooks | B23Q 17/003 318/567 |
| 2005/0222696 A1 * | 10/2005 | Ozaki | B25J 9/161 700/87 |
| 2008/0058835 A1 * | 3/2008 | Farritor | A61B 1/00158 606/130 |
| 2008/0249640 A1 * | 10/2008 | Vittor | B25J 9/06 700/9 |
| 2010/0166496 A1 * | 7/2010 | Bennett | A61B 17/32002 403/122 |
| 2011/0146441 A1 * | 6/2011 | Graham | B25J 9/06 74/490.04 |
| 2012/0122059 A1 * | 5/2012 | Schweikardt | A63H 33/04 434/118 |
| 2012/0192671 A1 * | 8/2012 | Riwan | B25J 19/0004 74/490.03 |
| 2013/0012821 A1 * | 1/2013 | Lin | A61B 34/73 600/473 |
| 2013/0110128 A1 * | 5/2013 | Schostek | A61B 1/00158 606/130 |
| 2013/0131865 A1 * | 5/2013 | Yamane | B62D 57/032 700/254 |
| 2013/0340560 A1 * | 12/2013 | Burridge | B25J 17/00 74/490.05 |

OTHER PUBLICATIONS

Das, et al., "A multiscale assembly & packaging system for manufacturing of complex micronano devices", in IEEE transactions on Automation science and engineering (T-ASE), vol. 9, issue 1, Jan. 2011.

Das, et al., "Automated microassembly using precision based hybrid control", in Proceedings of IEEE International conference on Robotics and automation (ICRA), Anchorage, Alaska, May 2010.

Popa, et al., "M3-deterministic, multiscale, multirobot platform for microsystems packaging: design and quasi-static precision evaluation", in IEEE transactions on automation science and engineering (T-ASE), vol. 6, issue 2, 2009.

Das, et al., "Precision alignment and assembly for a fourier transform microspectrometer", in International journal of micro-nano mechatronics (JMNM), vol. 5, No. 1-2, 2009.

Das, et al., "Precision evaluation of modular multiscale robots for peg-in-hole microassembly tasks", in Proceedings of International conference on intelligent robots and systems (IROS), San Francisco, CA, 2011.

Murthy, et al., "ARRIpede: An Assembled Die-Scale Microcrawler", VSP, Advanced Robotics 25, 2011.

Das, et al., "Precision-Based Robot Kinematic Design for Microassembly Applications", Proceedings of the ASME 2010 International Design Engineering Technical Conferences (IDETC) and Computers and Information in Engineering Conference, 2010.

Das, et al., "Design of Microassembly Through Process Modeling in Virtual Reality", Automation and Robotics Research Institute, in Proceedings of Microtech Conference and Expo, 2011.

Das, et al., "Concurrent Engineering through DfM2", Proceedings of Commericalization of Micro-Nano Systems Conference (COMS), 2011.

Das, et al., "Provision-based Robot Path Planning for Microassembly", in Proceedings of the 6th IEEE Conference on Automation Science and Engineering (CASE), Toronto, Canada, 527-532, Aug. 2010.

R. Hollis, et al., "An Architecture for Agile Assembly", In Proc. Am. Soc. of Precision Engineering, 10 Annual Mtg., 1995.

I. Chen, "Rapid Response Manufacturing Through Reconfigurable Robotic Workcells", Journal of Robotics and Computer Integrated Manufacturing, 2001.

Foreign search report for PCT/US/2013/066764, dated Aug. 29, 2014.

* cited by examiner

MODULAR AND RECONFIGURABLE MANUFACTURING SYSTEMS

CROSS-REFERENCE TO RELATED APPLICATION(S)

This application claims priority to U.S. Provisional Application Ser. No. 61/719,163, filed Oct. 26, 2012, which is hereby incorporated by reference herein in its entirety.

NOTICE OF GOVERNMENT-SPONSORED RESEARCH

This invention was made with Government support under grant/contract numbers N00014-08-C-0390 and N00012-11-C-0391 awarded by the Office of Naval Research. The Government has certain rights in the invention.

BACKGROUND

Today's industries depend on automation, mass production, and reliable output for the commercial success of their products. These factors, however, do not come cheap as they require highly sophisticated equipment in order to maintain the desired yield, throughput, and reliability. Generally, almost all such equipment comprises dedicated systems designed for specific tasks. These systems are typically extremely expensive and require advanced skills to operate.

Unfortunately, such systems are not appropriate in every application, such as those in which lower volumes of products are to be manufactured. In such cases, flexible manufacturing is the only solution that can offer the pathway to rapid, cost-effective production. This flexibility is generally considered to fall into two categories: machine flexibility and routing flexibility. The first category, machine flexibility, refers to the system's ability to be changed to produce new product types and the ability to change the order of operations executed on a part. The second category, routing flexibility, relates to the ability to use multiple machines to perform the same operation on a part, as well as the system's ability to absorb large-scale changes in volume, capacity, or capability. The advantages of flexible manufacturing systems include reduced manufacturing times, lower cost per unit, greater labor productivity, greater machine efficiency, reduced parts inventories, better adaptability to operations, and shorter lead times.

While such advantages can be obtained from flexible manufacturing systems, the systems have been difficult to achieve because of the cost to implement them and the need for substantial pre-planning. It can therefore be appreciated that it would be desirable to have a flexible manufacturing system that can be implemented more cheaply and with less pre-planning.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
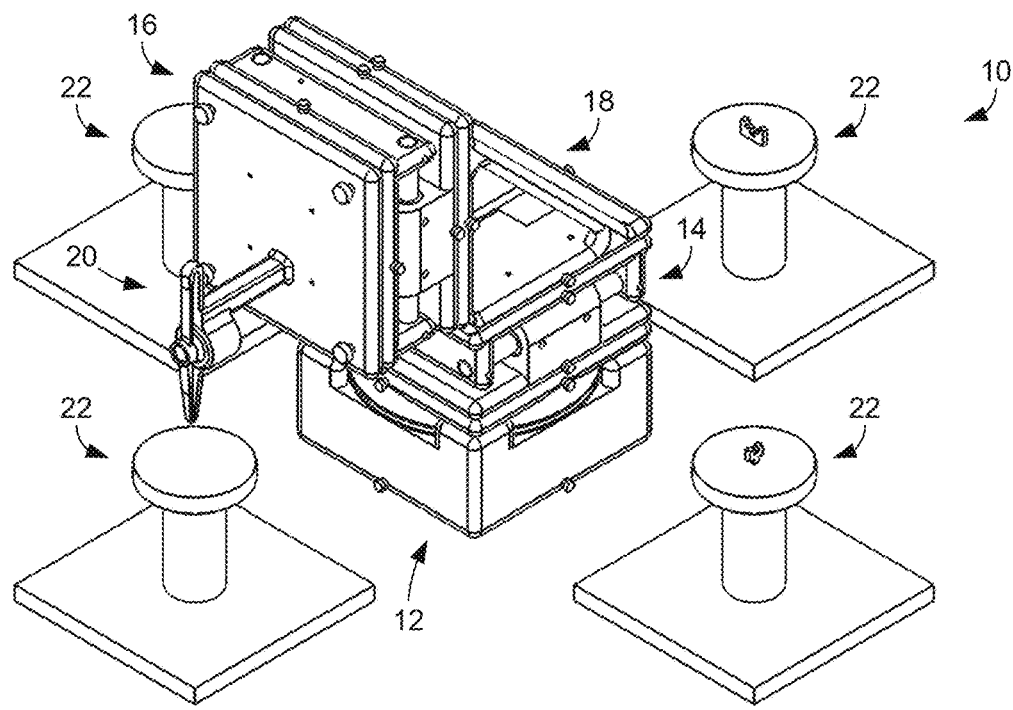
FIG. 1 is a perspective view of an embodiment of a modular and reconfigurable manufacturing system, the system shown in an example assembled configuration.

As described above, it would be desirable to have a flexible manufacturing system that can be implemented more cheaply and with less pre-planning than known systems. Disclosed herein are flexible manufacturing systems that achieve these goals. In some embodiments, a system comprises one or more manipulation modules that are capable of linear or rotational actuation, connecting means that can be used to both mechanically and electrically interconnect the modules, and an end effector that can be connected to one of the modules and used to perform discrete manufacturing actions. Because of the modularity of the system, the system can be assembled into multiple alternative configurations that are adapted to perform different tasks, for example, on different parts. Because of the nature of the connecting means, assembly and disassembly can be performed quickly and easily without the need to run electrical cables between each module and a central controller and, in some cases, without the use of any tools. In some embodiments, each component of the system comprises onboard intelligence so that control over the system's operation is distributed across the system.

In the following disclosure, various specific embodiments are described. It is to be understood that those embodiments are example implementations of the disclosed inventions and that alternative embodiments are possible. All such embodiments are intended to fall within the scope of this disclosure.

Conceptually speaking, manufacturability "M," which involves assembly and packaging via custom hardware, is a function of product complexity "$\Omega$," assembler reconfigurability "$\Lambda$," and production volume "v." Mathematically, these variables are related as follows:

$$M = f(\Omega, \Lambda, v) \qquad \text{[Equation 1]}$$

The expression in Equation 1 represents the governing dynamics of a flexible manufacturing system.

The complexity index $\Omega$ is a binary value that primarily suggests whether a specific task can be automated using a simple open loop control ($\Omega=0$) or requires complex closed loop control with active feedback-based manipulation ($\Omega=1$). The derivation is based upon a statistical model that suggests that, if the combined uncertainty of locating a part, grasping it with an end-effector, and manipulating it to the destination is lower than the designed tolerance in the mating mechanism at the destination, then there is a high probability (>99%) of successful assembly and thus the operation can be executed via open loop control.

On the other hand, the reconfigurability index Λ is a value ranging from 0 to 10 that suggests whether or not a robotic manipulation system is easy to reconfigure as a function of the percentages of cost and time associated with the reconfiguration. For absolutely fixed equipment, such as single-function tools and certain off-the-shelf hardware, the associated cost and time for reconfiguration is assumed to be infinity and thus the reconfigurability index for such a system is taken to be zero.

The production volume ν is incorporated in the form of histogram data where the number of bins and bin size are determined based upon the product type.

Finally the manufacturability index M is estimated as a value ranging from 0 to 10, with 10 representing the highest manufacturability.

Development of a modular and reconfigurable manufacturing system is motivated by the need for a truly flexible robotic hardware system that can serve as an application platform and experimental test-bed. FIG. 1 illustrates an example modular and reconfigurable manufacturing system 10, shown in an assembled state. As is apparent from FIG. 1, the system 10 comprises multiple manipulation modules that, in this example, include a rotational manipulation module 12, a first linear manipulation module 14, and a second linear manipulation module 16. In the system configuration shown in FIG. 1, the first linear manipulation module 14 is positioned on top of the rotational manipulation module 12 and is mechanically and electrically connected to the rotational manipulation module. The two linear manipulation modules 14, 16 are mechanically and electrically connected to each other by an angled fixture 18, which arranges the two modules in a manner in which they are orthogonal to each other. In this case, the top surface of the first linear manipulation module 14, like the top surface of the rotational manipulation module 12, lies in a horizontal plane, while the top surface of the second linear manipulation module 16 lies in a vertical plane.

With continued reference to FIG. 1, the modular and reconfigurable manufacturing system 10 further comprises an end effector 20. In the illustrated embodiment, the end effector 18 is configured as an electromagnetic gripper. It is noted, however, that other end effectors, such as dispensers, electrical probes, and touch probes could be used. In the system configuration of FIG. 1, the end effector 20 is mechanically and electrically connected to the second linear manipulation module 16.

Example configurations for the above-described components, as well as the manner in which they can connect to each other, are discussed in detail below in relation to FIGS. 2-8.

Also included in the modular and reconfigurable manufacturing system 10 shown in FIG. 1 are multiple part supports 22 that, when provided, can be used to support parts that are to be acted upon by the system 10 (i.e., by the end effector 18).

Figure 2:
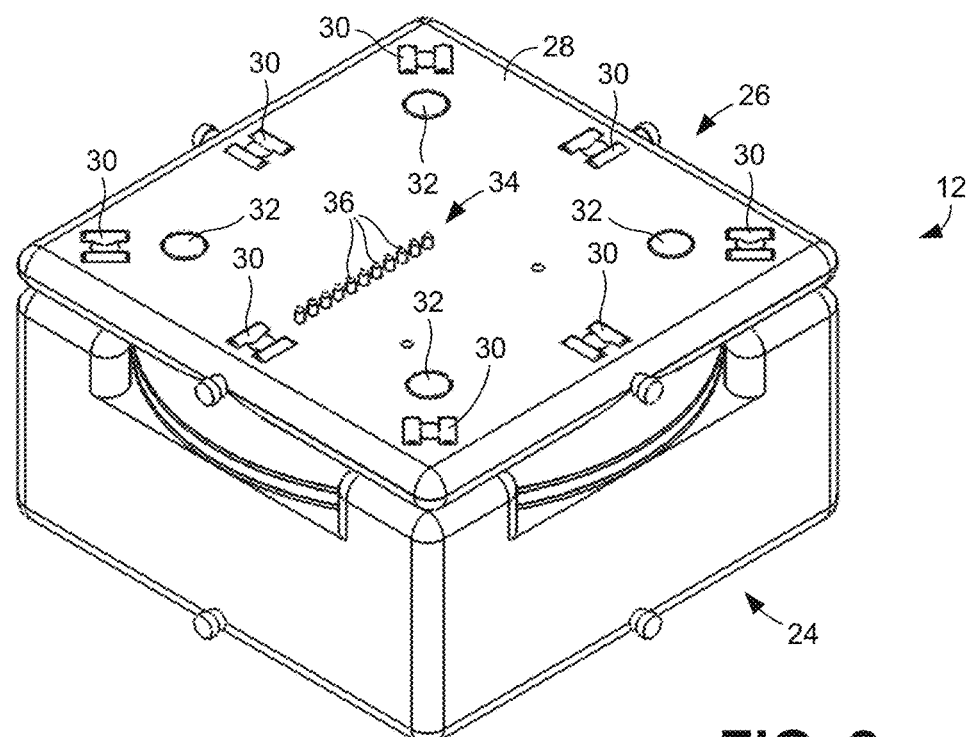
FIG. 2 is a perspective view of an embodiment of a rotational manipulation module shown in FIG. 1.
Figure 3:
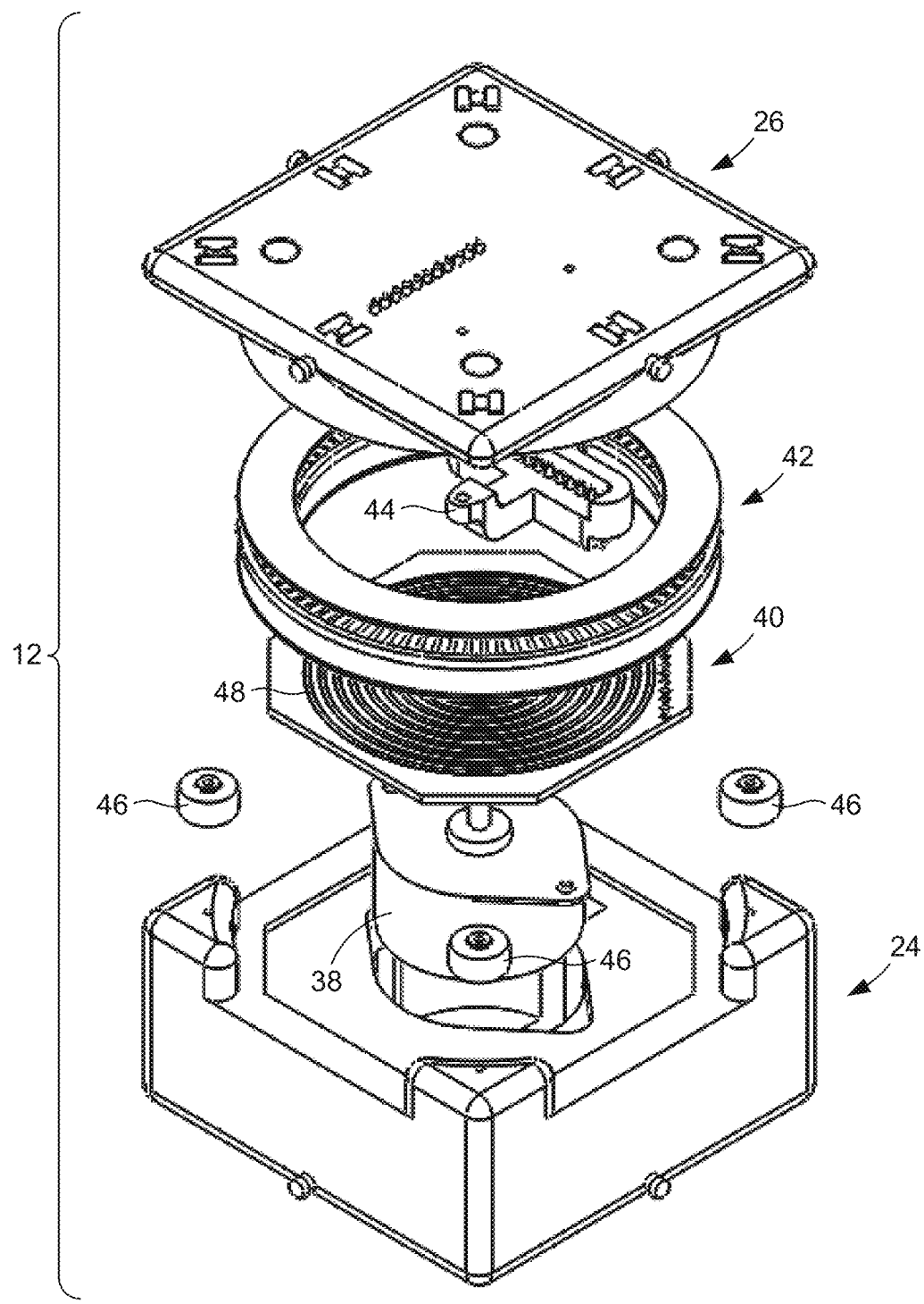
FIG. 3 is an exploded perspective view of the rotational manipulation module of FIG. 2.

FIGS. 2 and 3 illustrate an example embodiment for the rotational manipulation module 12 shown in FIG. 1. Beginning with FIG. 2, the module 12 includes a base 24 and a rotatable platform 26 that is mounted to the base. In the illustrated embodiment, both the base 24 and the platform 26 are generally rectangular and therefore comprise four orthogonal sides or edges. The platform 26 has a generally planar top surface 28 that acts as a mating surface when the module 12 is connected to another component of the system 10. Provided around the periphery of the platform 26 on its top surface 28 are alignment elements 30 that help align and secure the other component relative to the platform. In the illustrated embodiment, there are eight pairs of alignment elements 30, one pair provided along each of the four edges and four corners of the platform 26.

Further provided on the top surface 28 of the platform 26 are permanent magnets 32 that facilitate mechanical connection between the module 12 and another component of the system 10. In the illustrated embodiment, four magnets 32 are provided, one positioned near each of the four corners of the platform 26. In addition, the top surface 28 of the platform 26 also includes an electrical connector 34 that facilitates electrical connection between the module 12 and another component of the system 10. The electrical connector 34 includes multiple spring-loaded pins 36 that can be used to deliver power and signals to and from the module 12. As shown in FIG. 2, the pins 36 are arranged in a straight line that extends from the center of the platform 26 outward toward one of the edges of the platform. In the illustrated embodiment, the line includes eleven pins 36.

FIG. 3 shows the rotational manipulation module 12 in exploded view. As can be appreciated from this figure, housed within the module 12 between the base 24 and the platform 26 are an electric motor 38, a circuit board 40, multiple rings 42 of an internal bearing, an internal electrical connector 44, and multiple cylindrical rollers 46. The electric motor 38 mounts to the base 24 and is used to drive rotation of the platform 26. The circuit board 40 is also mounted to the base 24. Mounted to the circuit board is a microcontroller (not visible) that can be used to communicate with other components of the system 10, and multiple circular contacts 48 that make electrical contact with pins of the internal electrical connector 44, which is mounted to the platform 26. Together, the contacts 48 and the pins of the internal electrical connector 44 facilitate the transmission of power and signals between the base 24 and the platform 26. The rings 42 of the internal bearing level the platform 26 as it rotates and the rollers 46 ensure proper alignment of the bearing.

Figure 4:
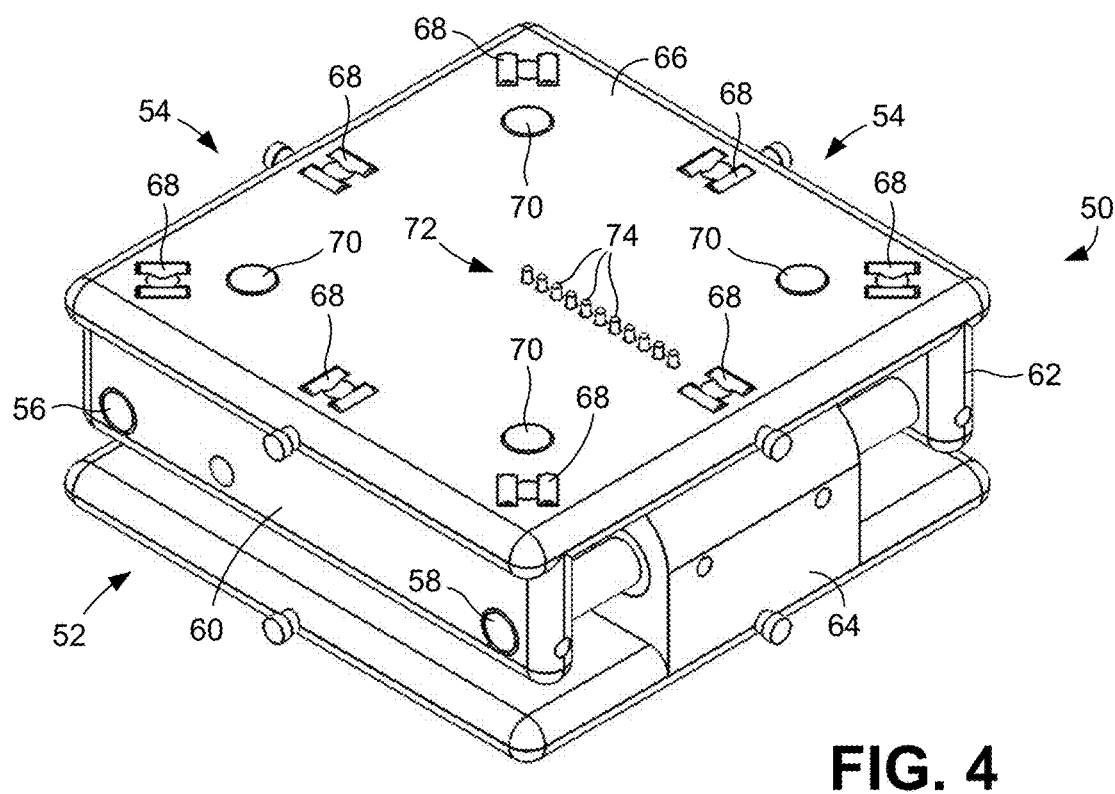
FIG. 4 is a top perspective view of an embodiment of a linear manipulation module shown in FIG. 1.
Figure 5:
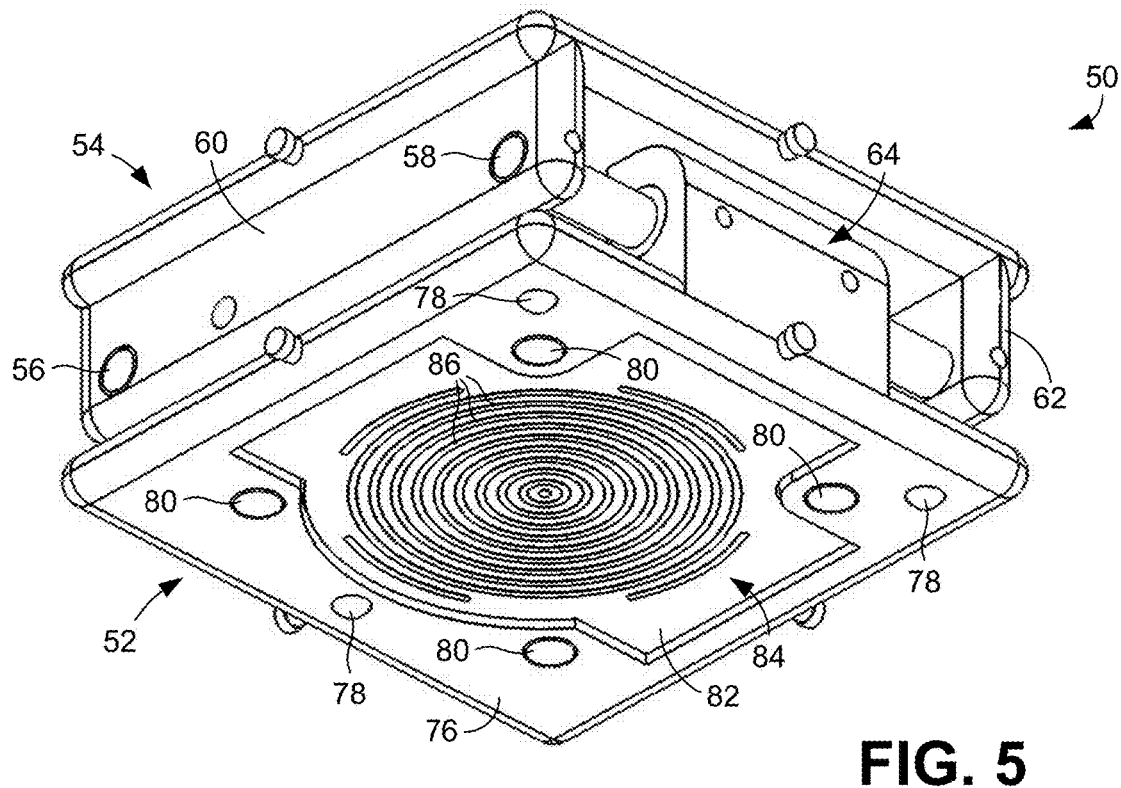
FIG. 5 is a bottom perspective view of the linear manipulation module of FIG. 4.
Figure 6:
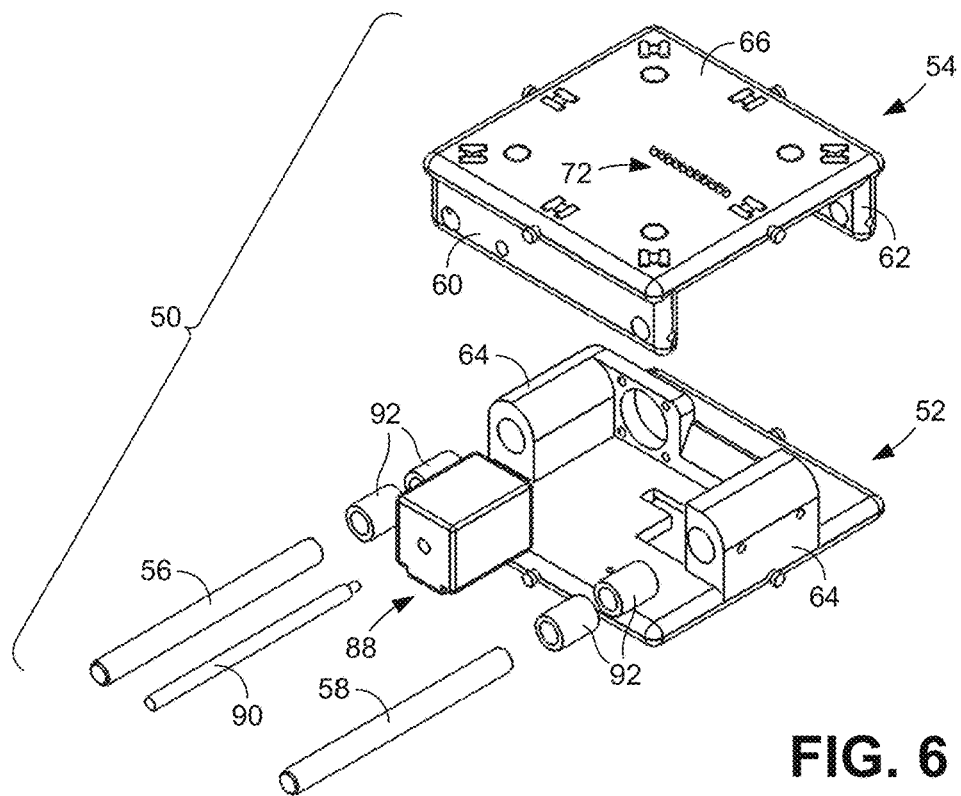
FIG. 6 is an exploded perspective view of the linear manipulation module of FIG. 4.

FIGS. 4-6 illustrate an example embodiment of a linear manipulation module 50, which can be used as the module 14 or 16 shown in FIG. 1. Beginning with FIG. 4, the module 50 includes a base 52 and a linearly-displaceable platform 54. The platform 54 is supported by two shafts 56 and 58 that are affixed to end plates 60 and 62 that extend down from the platform. The shafts 56, 58 are, in turn, supported by bearings 64 (only one bearing visible in FIG. 4) that are mounted to the base 52.

In the illustrated embodiment, both the base 52 and the platform 54 are generally rectangular and therefore comprise four orthogonal sides or edges. The platform 54 has a generally planar top surface 66 that, like the surface 28 of the rotational manipulation module's platform 26, acts as a mating surface when the module 50 is connected to another component of the system. Provided around the periphery of the platform 54 on its top surface 66 are alignment elements 68 that help align and secure the other component relative to the platform. In the illustrated embodiment, there are eight pairs of alignment elements 68, one pair provided along each of the four edges and four corners of the platform 54.

Further provided on the top surface 66 of the platform 54 are permanent magnets 70 that facilitate mechanical connection between the module 50 and another component of the system. In the illustrated embodiment, four magnets 70 are provided, one positioned near each of the four corners of the platform 54. In addition, the top surface 66 of the platform 54 also includes an electrical connector 72 that facilitates electrical connection between the module 50 and another component of the system 10. The electrical connector 72 includes multiple spring-loaded pins 74 that can be used to deliver power and signals to and from the module 50. As shown in FIG. 4, the pins 74 are arranged in a line that extends from the center of the platform 54 outward toward one of the edges of the platform. In the illustrated embodiment, the line includes eleven pins 74.

FIG. 5 shows the bottom of the linear manipulation module 50. As indicated in this figure, the base 52 of the module 50 includes a generally planar bottom surface 76 that can also act as a mating surface when the module is connected to another component in the system 10. Provided on the bottom surface 76 are alignment elements 78 that help align and secure the module 50 relative to the platform of another component of the system 10. The alignment elements 78 are adapted to be received by the alignment elements provided on the other component's platform, such as the alignment elements 30 provided on the rotational manipulation module 12 described above.

Also provided on the bottom surface 76 are permanent magnets 80 that facilitate mechanical connection between the module 50 and another component of the system 10. In the illustrated embodiment, four magnets 80 are provided, one positioned near each of the four corners of the bottom surface 76. With such a configuration, the magnets 80 will align with the magnets of another component of the system 10 when the module is aligned with the other component in one of four different orthogonal positions (0°, 90°, 180°, or 270° relative to the other component). Notably, the magnets 80 provided on the bottom of the module 50 have the opposite polarity of the magnets 70 provided on the top of the module. When each of the interfacing components of the system 10 (including the rotational manipulation module 12) have such an arrangement, the magnets of one component will be attracted to the magnets of another component when the two components are brought together for connection.

Contained within the base 52 and exposed at the bottom of the base is a circuit board 82 that includes a microprocessor (not visible) and an electrical connector 84 that includes multiple continuous circular contacts 86. The contacts 86 are arranged so that the pins of an electrical connector of another module (e.g., the pins 36 of the electrical connector 34 of the rotational manipulator module 12) will make independent contact with the various contacts irrespective of the relative orientations of the two modules. Accordingly, the module 50 can, for example, be placed on top of the module 12 in any one of four orthogonal orientations relative to the module 12 and positive contact will be made between each pin 36 and a contact 86. In the illustrated embodiment, eleven contacts 86 are provided.

FIG. 6 shows the linear manipulation module 50 in exploded view. As can be appreciated from this figure, housed within the module 50 between the base 52 and the platform 54 is an electric motor 88. The motor 88 is mounted to the base 52 and includes a drive shaft 90 that is affixed at its distal end to one of the end plates 60 of the platform 54. When the motor 88 is operated, the shaft 90 is extended or retracted so as to linearly displace the platform 54 relative to the base 52. Also shown in FIG. 6 are internal bearing elements 92 that enable the shafts 56, 58 to smoothly slide in the bearings 64 during operation of the motor 88.

Figure 7:
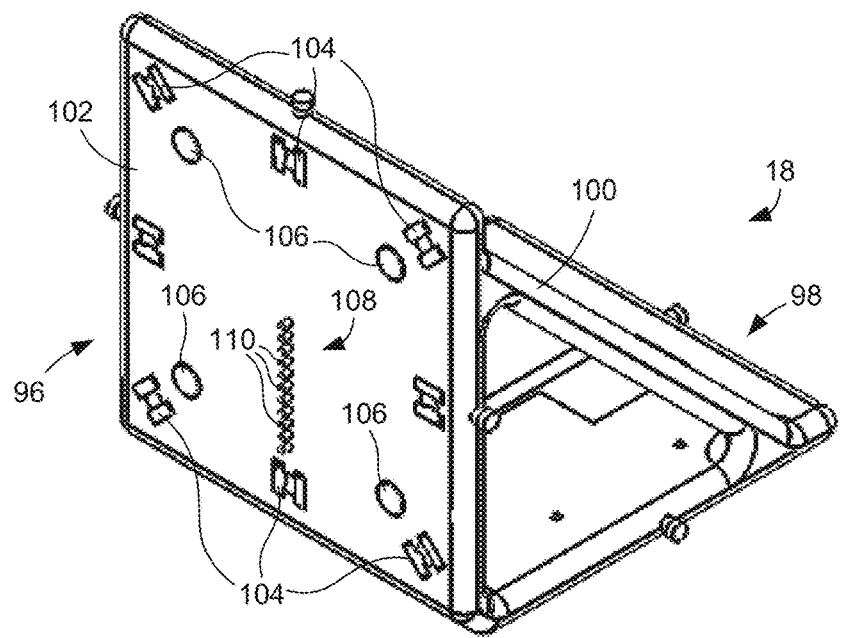
FIG. 7 is a perspective view of an embodiment of an angled fixture shown in FIG. 1.

FIG. 7 illustrates an example embodiment for the angled fixture 18. As shown in this figure, the fixture 18 generally comprises first and second platforms 96 and 98 that are arranged in orthogonal planes. Extending between the platforms 96, 98 are braces 100 (only one brace visible in FIG. 7) that maintain the orthogonal relationship and provide structural support to the fixture 18.

The first platform 96 can have a configuration similar to the platforms 26 and 54 described above. Therefore, the platform 96 can comprise a generally planar outer surface 102 that acts as a mating surface when the fixture 18 is connected to another component of the system 10. Provided around the periphery of the platform 96 on the surface 102 are alignment elements 104 that align and secure the other component relative to the platform. In the illustrated embodiment, there are eight pairs of alignment elements 104, one pair provided along each of the four edges and four corners of the platform 96.

Further provided on the surface 102 of the platform 96 are permanent magnets 106 that facilitate mechanical connection between the fixture 18 and another component of the system. In the illustrated embodiment, four magnets 106 are provided, one positioned near each of the four corners of the platform 96. In addition, the surface 102 of the platform 96 also includes an electrical connector 108 that facilitates electrical connection between the fixture 18 and another component of the system 10. The electrical connector 108 includes multiple spring-loaded pins 110 that can be used to deliver power and signals to and from the fixture 18. As shown in FIG. 7, the pins 110 are arranged in a line that extends from the center of the platform 96 outward toward one of the edges of the platform. In the illustrated embodiment, the line includes eleven pins 110.

Although not visible in FIG. 7, the bottom of the platform 98 can have a configuration similar to the bottom of the linear manipulation module 50 shown in FIG. 5. Accordingly, the bottom of the platform 98 can at least comprise permanent magnets that facilitate mechanical connection between the fixture 18 and another component of the system 10 and a circuit board that comprises a microprocessor and an electrical connector that includes multiple circular contacts.

Figure 8:
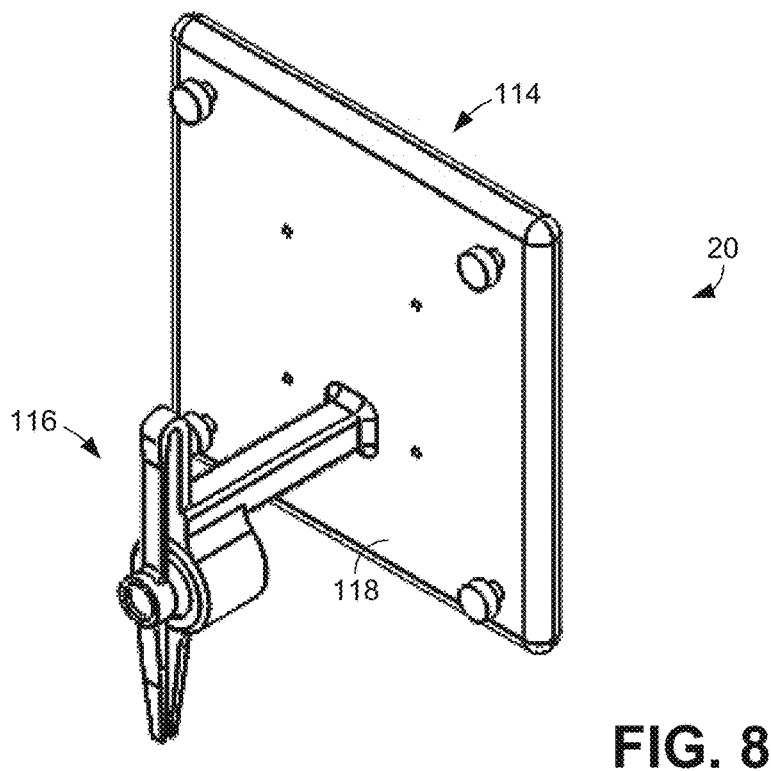
FIG. 8 is a perspective view of an embodiment of an end effector shown in FIG. 1.

FIG. 8 illustrates an embodiment for the end effector 20. As shown in this figure, the end effector 20 comprises a generally planar platform 114 and an actuable tool 116 that is mounted to a front surface 118 of the platform. Although not visible in FIG. 8, the rear of the platform 114 can also have a configuration similar to the bottom of the linear manipulation module 50 shown in FIG. 5. Accordingly, the rear surface of the platform 114 can at least comprise permanent magnets that facilitate mechanical connection between the end effector 20 and another component of the system 10 and a circuit board that comprises a microprocessor and an electrical connector that includes multiple circular contacts.

With the configuration of the system components described above, the modular and reconfigurable manufacturing system 10 can be quickly and easily assembled and disassembled. To assemble the system 10, the various components (e.g., modules, fixtures, and end effector) can be connected together using the magnets provided on each component. For instance, as indicated in FIG. 1, the first linear manipulation module 14 can be connected to the rotational manipulation module 12, with the magnets 80 provided on the bottom of the first linear manipulation module engaging the magnets 32 provided on the top of the rotational manipulation module. Because of the attraction between the magnets, the two modules can be "snap fit" together by simply placing the first linear manipulation module 14 on top of rotational manipulation module 12 in the desired orthogonal position. When the two modules 12, 14 are physically connected in this manner, they are automatically electrically connected as well because of the contacts 86 provided on the bottom of the linear manipulation module 14 and the pins 36 provided on the top of the rotational manipulation module 12. During disassembly, the modules 12, 14 can be separated by simply pulling them apart against the force of the magnets 32, 80 in a "quick release" scheme.

Next, the angled fixture 18 can be connected to the linear manipulation module 14. As with the linear manipulation module 14 and the rotational manipulation module 12, the fixture 18 can be both mechanically and electrically connected to the linear manipulation module by simply placing the fixture on top of the linear manipulation module in the desired orthogonal position. At this point, the second linear manipulation module 16 can be connected to the angled fixture 18. In particular, the linear manipulation module 16 can be both mechanically and electrically connected to the angled fixture 18 by simply contacting the module's bottom surface 76 (FIG. 5) to the outer surface 102 of the first platform 96 of the angled fixture 18 (FIG. 7) in the desired orthogonal position. Finally, the end effector 20 can be both mechanically and electrically connected to the second linear manipulation module 16 by simply contacting its bottom surface to the top surface 66 of the linear manipulator module (FIG. 4) in the desired orthogonal position.

Figure 11A:
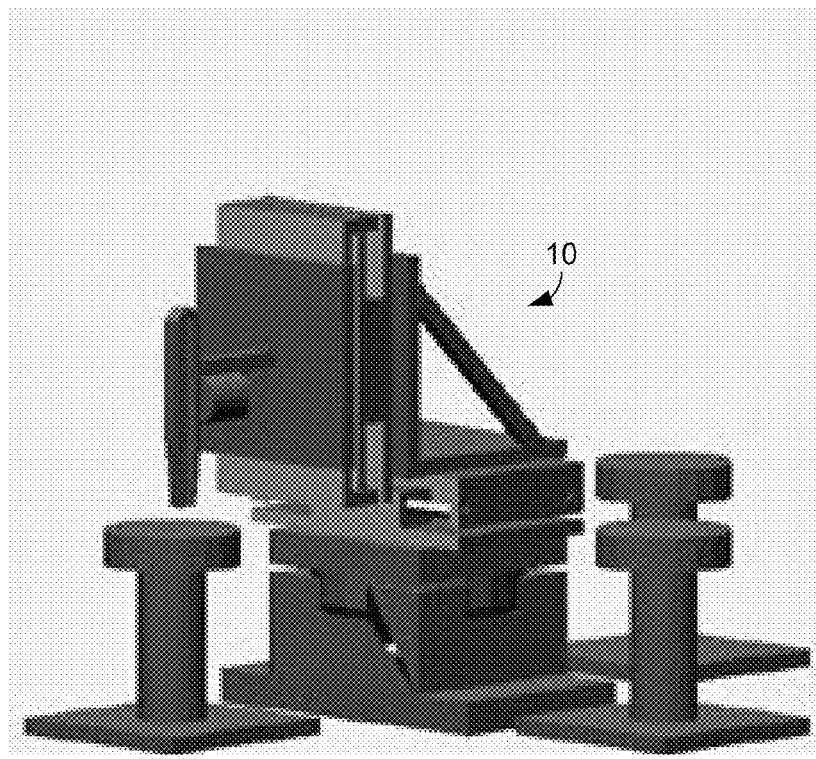
FIGS. 11A and 11B are renderings of two system configurations that were used to perform the assembly task depicted in FIG. 10.

Once each of the components has been electrically connected in the manner described above, the microprocessors resident on each component share the same bus and can send and receive signals to and from each other and a master controller. The master controller can, for example, connect to the bus using a cable that is connected to a base unit (not shown) that is provided on a support surface (e.g., floor or table top) and that connects with and supports one of the manipulator modules (see FIG. 11A). In such a case, the base unit can have a top platform that has a configuration similar to that described above for the platforms 26 and 54 (i.e., similar magnets and electrical connector). Alternatively the master controller can wirelessly connect to the bus. In either case, the master controller can be used to send commands to the individual components to actuate them as necessary to perform a given task. Because each of the components has its own intelligence provided by its microprocessor, each command can be specifically addressed to the particular component for which it is intended. In addition, each component can automatically communicate its own position and orientation within the system 10 to the master controller. In some embodiments, each component determines its position and orientation in the system by communicating with its neighboring components to determine its position and orientation relative to the neighboring components. If the position and orientation of one of the components (e.g., the base unit) is known, these relative positions and orientations can be converted into absolute positions and orientations. Accordingly, control is distributed across each of the components of the system as opposed to being solely comprised by a central controller.

As can be appreciated from the above assembly example, the system 10 can be assembled by someone without any specialized skill or tools. Regardless, once the system 10 is assembled it can be used to perform whatever manufacturing tasks it was constructed to perform. Once it is no longer needed for those particular tasks, it can be disassembled, by simply pulling the components apart against the attractive forces of the magnets, and reassembled in a new configuration that is adapted to perform another manufacturing task.

Figure 9:
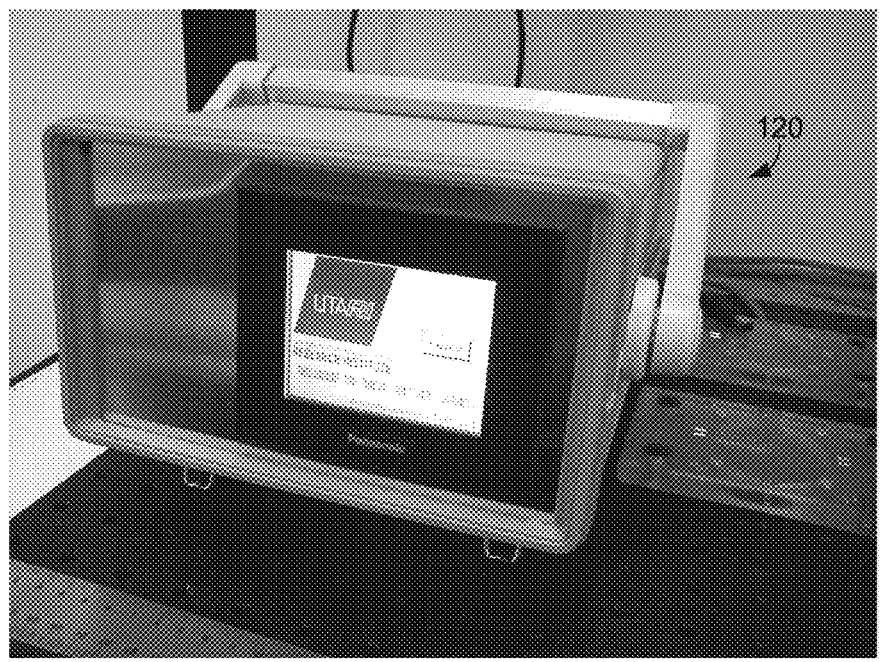
FIG. 9 is photograph of an example master controller that can be integrated into the system of FIG. 1.

FIG. 9 is a photograph of an example master controller 120 that can comprise a custom-designed motion control circuit board that interfaces the manipulation modules with motor drives, peripherals (such as a touch screen panel of the controller), and a computer. As opposed to the 1:1 mapping between motor drives and manipulation units used in commercial systems, the controller 120 enables 1:8 mapping of motor drive and manipulator. Through a multiplexed signaling architecture, the controller 120 enables a single motor drive to run up to eight manipulators.

Various communication protocols can be used to interface modules of the system 10. For example, the touch screen panel can be interfaced with the master controller via a full-duplex serial communication. The manipulation modules can be connected to each other and to the master controller over an $I^2C$ bus. USB connectivity can be established between the master controller and a computer. Lastly a few time-critical communication channels can be hardwired within the system 10.

Notably, other peripheral units, such as a microscope, a vacuum pump, or a data acquisition module, can be integrated into the system 10. Such units can be used in different types of operations executing the custom automation plans.

The modular and reconfigurable manufacturing system 10 was analytically evaluated. In the evaluation, a simple two-step pick-and-place task was chosen as a case study. This task is depicted in FIG. 10.

Figure 10:
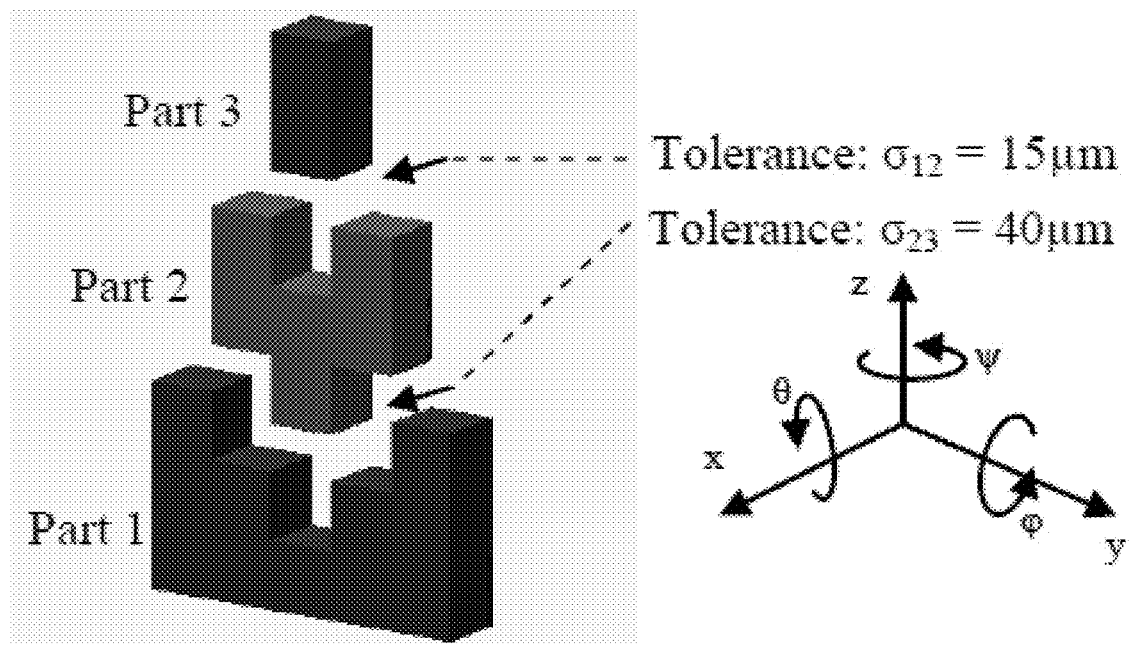
FIG. 10 is a depiction of an assembly task that was used to evaluate a prototype modular and reconfigurable manufacturing system.
Figure 11B:
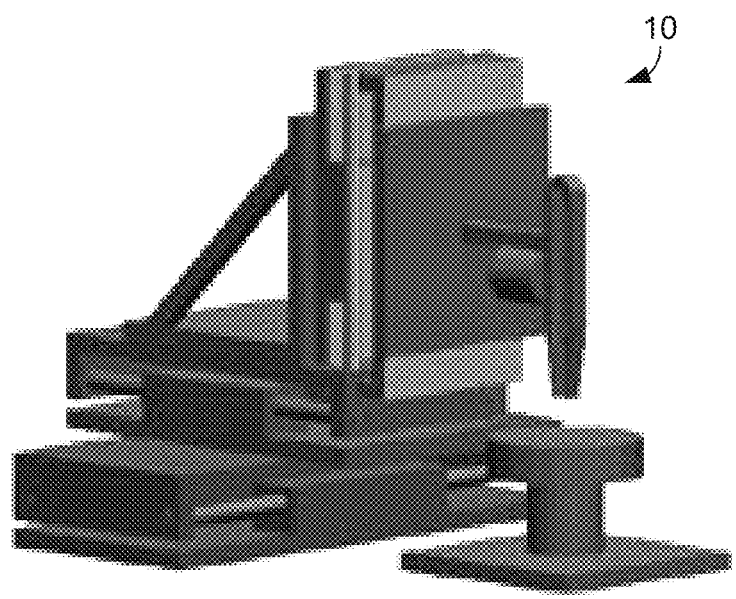

Two different configurations of the system 10 were tested to accomplish the task as shown in FIG. 10. The first system configuration (FIG. 11A) was an RPP robot having $\Psi$-y-z degrees of freedom. The second system configuration (FIG. 11B) was a PPP robot having x-y-z degrees of freedom. System configuration 1 assembled a product by moving individual parts from one station to another with the rotation manipulation module acting as a turret to position the end effector over one of three stations. System configuration 2 assembled the product on a single platform by positioning the end effector in three-dimensional space. In both cases, for the sake of simplicity, it was assumed that the parts are fixed in the sample holder(s) in such a way that there was no misalignment along the rotation axes. Kinematic details for the two system configurations are provided in Tables I and II.

TABLE I

KINEMATIC SETUP OF CONFIGURATION 1

| Degree of freedom (DoF) | Order from the root of the chain | DoF type | DoF range of motion | Accuracy |
|---|---|---|---|---|
| $\Psi$ | 1 | Revolute | 360° | 7.5° |
| y | 2 | Prismatic | 50 mm | 8 μm |
| z | 3 | Prismatic | 30 mm | 5 μm |

TABLE II

KINEMATIC SETUP OF CONFIGURATION 2

| Degree of freedom (DoF) | Order from the root of the chain | DoF type | DoF range of motion | Accuracy |
|---|---|---|---|---|
| x | 2 | Prismatic | 50 mm | 8 μm |
| y | 1 | Prismatic | 70 mm | 12 μm |
| z | 3 | Prismatic | 30 mm | 5 μm |

As indicated in the above tables, different manipulation modules have different precision values. Furthermore, the position of these modules in the serial robot kinematic chain also impacted the error at the tip of the end effector.

Assembly feasibility estimation was computed using the following analytical model:

$$_N^0 T(\theta) \cong \left[\prod_{i=1}^{n}\left[\left(e^{\hat{\xi}_i \theta_i} + \delta\hat{\xi}_i \theta_i\right) \cdot e^{\hat{\xi}_i \delta\theta_i}\right]\right]\left[_N^0 T(0)\right] \quad \text{[Equation 2]}$$

where θ is the joint angle in case of revolute joints and displacement in case of prismatic joints, ξ is the twist vector representing the instantaneous motion of a link, and T is the transformation matrix. In Equation 2, the additive term is the "static error" or error due to link misalignment, whereas the multiplicative term is the "dynamic error" or error due to joint motion.

The inventors' proprietary iterative analysis software called "Design for Multiscale Manufacturability (DfM2)" was used in order to build a statistical model of the common manufacturing metrics, such as production yield, cycle time, and overall cost for the two system configurations.

After 1,000 iterations in the analyzer, the statistical data for the two robot configurations suggest the manufacturing metrics shown in Table III.

TABLE III

MANUFACTURING METRICS OBTAINED FROM COMPUTATIONS VIA THE ANALYTICAL MODEL

| Robot configuration | No. of iterations | Overall Yield [b] | Cost (% of optimum) [a] | Time (% of optimum) [a] |
|---|---|---|---|---|
| 1 (FIG. 11A) | 1000 | 83% | 50% | 77% |
| 2 (FIG. 11B) | 1000 | 92% | 48% | 80% |

[a] optimum desired cost: $3,600; optimum desired time taken in assembly: 4 minutes
[b] using the design tolerance values as mentioned in the FIG. 4 for the parts As is evident from the data in Table III, system configuration 2 offered better yield and cost efficiency at a marginal increase in cycle time. Therefore, although both configurations are capable of executing the specified task, system configuration 2 was better suited for the task. Furthermore, as the tolerance levels for the assembly task changed it also affected the manufacturing metrics. This is shown in Table IV.

TABLE IV

PERFORMANCE WITH VARYING ASSEMBLY TOLERANCE

| Tolerance | Configuration 1 Yield | Configuration 2 Yield |
|---|---|---|
| $\sigma_{12}$: 15 μm, $\sigma_{23}$ = 40 μm | 83% | 92% |
| $\sigma_{12}$: 10 μm, $\sigma_{23}$: 30 μm | 54% | 88% |
| $\sigma_{12}$: 5 μm, $\sigma_{23}$: 20 μm | 7% | 76% |

It can be appreciated from Table IV that system configuration 2 is a better option as the tolerance for the assembly gets tighter.

Prototype modules were also constructed to validate the analytical results described above. The prototype module specifications are given in Table V.

TABLE V

PROTOTYPE MODULE SPECIFICATIONS

| Parameter | Value | Unit |
|---|---|---|
| Resolution | 4 to 15 | μm |
| Range of motion (linear module) | 30 to 70 | mm |
| Range of motion (rotation module) | 360 | degrees |
| Maximum thrust | 10 | lb |
| Maximum speed | 3 | mm/sec |
| Pull force limit of interconnects | 20 | lb |
| Motor type | Stepper | — |
| Motor power rating | 5/0.25 | Volt/Ampere |
| System power rating | 24/0.9 | Volt/Ampere |
| Typical configuration time | <2 | minutes |
| Typical calibration/program time | <5 | minutes |
| Manipulation module cost | ~300 | $ |
| Controller system cost | ~500 | $ |
| Manipulators per controller | 8 | — |
| Size (length × width × height) | (90-185) × 90 × 35 | mm³ |
| Weight | 420 to 780 | grams |
| Individual cabling to manipulator | Not required | — |
| Communication frequency | 10 | KHz |
| Computation frequency | 20 | MHz |
| Stand-alone interface | Touch panel | — |
| PC connectivity | USB | — |
| Configuration identification | Automatic | — |
| Assembly automation mode | Programmable | — |

The experimentation that was conducted to validate the analysis comprised the following process. First, the parts were pre-fixtured on the sample holder prior to the assembly. The experimentation began with a blank base plate mounted to an optical table. The system was then powered on and was assembled by placing the manipulation modules in a serial order, starting with placing the first module on the base plate and subsequent modules onto the previous modules. During this process, the master controller automatically identified the modules' position and orientation with respect to a global coordinate frame.

Once the desired system configuration was achieved, a calibration command was sent from the master controller, which initiated a multi-point calibration performed by each of the modules under the field of view (FoV) of a fixed camera. It was assumed, and also experimentally verified, that, during assembly of the system, the locking error in each robotic module was well within the size of the FoV, in which case these errors would be observable.

After the calibration, an automation program was retrieved from an on-board memory card of the master controller and the program was executed to cause the calibrated modules to perform the assembly task. During this step, the master controller implemented a precision optimized path planning and control algorithm for the automation.

The success percentage of the system was measured as the ratio of the number of parts assembled versus the total number parts in the device. After assembly was completed, the manipulation modules were dismantled and main power was turned off. Multiple repetitions of the experiment were performed and, after the desired number of iterations, the compiled data on manufacturing performances was statistically analyzed.

Table VI shows the data from the experimentations conducted on the prototype modular and reconfigurable system according to the steps described above.

TABLE VI

MANUFACTURING METRICS OBTAINED EXPERIMENTALLY USING ROBOT CONFIGURATION 2 (FIG. 11B) FOR 10 ITERATIONS

| Parameter | Value | Deviation from analytical model |
|---|---|---|
| Overall yield | 90% | −2% |
| Average time/assembly | 3 min. 36 sec. | +6% |
| Total manufacturing cost | $1,850 | +3.3% |

As can be appreciated from Table VI, the experimental finding for assembly using the system was close to the analytical predictions. The higher cycle time can be due to delays in image stabilization/processing during the calibration steps. The marginal increase in the actual cost was due to the labor associated with additional cycle time.

What is claimed is:

1. A modular manufacturing system comprising:
multiple manipulation modules each including a base and a platform configured to either linearly move relative to the base or rotate relative to the base, the platform having a top planar mating surface comprising alignment elements configured to align the module with other components of the system, connection elements separate from the alignment elements configured to mechanically attach the module to other components of the system, and an array of electrical contacts configured to electrically connect the module with electrical contacts of other components of the system, the electrical contacts comprising spring-loaded pins that are radially arranged from a center of the top planar mating surface outward toward an edge of the top mating surface, the base having a bottom planar mating surface comprising alignment elements configured to align the module with other components of the system, connection elements separate from the alignment elements configured to mechanically attach the module to other components of the system, and an array of electrical contacts configured to electrically connect the module with electrical contacts of other components of the system, the electrical contacts comprising concentrically arranged continuous circular contacts that are each configured to contact a radially arranged spring-loaded pin of another component of the system; and
an end effector including a tool configured to perform a manufacturing task and a planar mating surface comprising alignment elements configured to align the end effector with other components of the system, connection elements separate from the alignment elements configured to mechanically attach the end effector to other components of the system, and an array of electrical contacts configured to electrically connect the end effector with electrical contacts of other components of the system, the electrical contacts comprising concentrically arranged continuous circular contacts that are each configured to contact a radially arranged spring-loaded pin of another component of the system;
wherein the modules and end effector can be mechanically and electrically connected in multiple configurations to alter the configuration of the system and the manufacturing tasks that the system can perform.

2. The system of claim 1, wherein the connection elements comprise permanent magnets that enable snap fitting to and quick release from other components in the system.

3. The system of claim 1, wherein the manipulation modules and the end effector each comprise a microprocessor, wherein the microprocessors are connected to a shared bus to distribute control of the system.

4. The system of claim 3, further comprising a master controller configured to communicate with the manipulation modules and the end effector, wherein the manipulation modules and the end effector are each configured to automatically communicate their respective positions and orientations within the system to the master controller.

5. The system of claim 1, further comprising an angled fixture including first and second platforms that lie in different orthogonal planes, the first platform having a planar mating surface comprising alignment elements configured to align the fixture with other components of the system, connection elements separate from the alignment elements configured to mechanically attach the fixture to other components of the system, and an array of contacts configured to electrically connect the fixture with electrical contacts of other components of the system, the second platform having a planar mating surface comprising alignment elements configured to align the fixture with other components of the system, connection elements separate from the alignment elements configured to mechanically attach the fixture to other components of the system, and an array of contacts configured to electrically connect the fixture with electrical contacts of other components of the system.

* * * * *